United States Patent [19]

Koss

[11] Patent Number: 5,122,921
[45] Date of Patent: Jun. 16, 1992

[54] DEVICE FOR ELECTROMAGNETIC STATIC AND VOLTAGE SUPPRESSION

[75] Inventor: Michael R. Koss, Indianapolis, Ind.

[73] Assignee: Industrial Communication Engineers, Ltd., Indianapolis, Ind.

[21] Appl. No.: 515,058

[22] Filed: Apr. 26, 1990

[51] Int. Cl.$^5$ ............................................. H02H 3/22
[52] U.S. Cl. ..................... 361/111; 361/113; 361/118; 361/119; 361/120
[58] Field of Search ............... 361/56, 107, 111, 117, 361/118, 119, 120, 112, 56; 333/12, 23, 167

[56] References Cited

U.S. PATENT DOCUMENTS

| | | | |
|---|---|---|---|
| 2,030,178 | 2/1936 | Potter | 178/44 |
| 2,030,179 | 2/1936 | Potter | 178/44 |
| 2,030,180 | 2/1936 | Potter | 178/44 |
| 2,777,998 | 1/1957 | Shepherd | 333/70 |
| 2,886,744 | 5/1959 | McNatt | 317/61 |
| 2,922,913 | 1/1960 | Cushman | 313/225 |
| 3,274,447 | 9/1966 | Nelson | 317/61 |
| 3,777,219 | 12/1973 | Winters | 317/61.5 |
| 3,863,111 | 1/1975 | Martzloff | 317/61.5 |
| 3,968,411 | 7/1976 | Mueller | 317/61.5 |
| 4,050,092 | 9/1977 | Simokat | 361/56 |
| 4,142,220 | 2/1979 | Lundsgaard | 361/120 |
| 4,158,869 | 6/1979 | Gilberts | 361/118 |
| 4,359,764 | 11/1982 | Block | 361/119 |
| 4,409,637 | 10/1983 | Block | 361/119 |
| 4,554,608 | 11/1985 | Block | 361/119 |

Primary Examiner—Todd E. DeBoer
Assistant Examiner—S. Jackson
Attorney, Agent, or Firm—Ice Miller Donadio & Ryan

[57] ABSTRACT

A device for suppressing electromagnetic static and voltage surges induced on radio frequency transmission cables is disclosed. The device comprises a blocking capacitor connected to prevent the conduction of DC currents but to permit the transmission of radio frequency signals. An inductor coil is connected between one side of the capacitor and ground. The inductor coil is of a value that blocks conduction of radio frequency signals but allows static and low frequency DC voltage surges to be conducted to ground. A gas discharge unit is also connected from the same side of the capacitor to ground. The discharge unit is a secondary discharge device that only operates when the transient speed and magnitude of the surge is sufficient to cause a back emf to develop across the inductor coil above a predetermined limit. The gas discharge unit assures that the capacitor is not damaged by the back emf. A resistor is connected between the other side of the capacitor and ground to discharge any DC voltage developed on the other side of said capacitor.

15 Claims, 1 Drawing Sheet

DEVICE FOR ELECTROMAGNETIC STATIC AND VOLTAGE SUPPRESSION

BACKGROUND OF THE INVENTION

1. Field of the Invention

This invention relates to a device to neutralize acquired static and voltage impulse transients which occur naturally such as from lightning or from man made sources. The device is used to protect valuable radio and television transmitting and receiving sets and systems from damage due to these transients.

2. Description of the Prior Art

Unlike earlier vacuum tube systems, modern semiconductor based radio and television equipment is particularly susceptible to damage from lightning strikes and other induced voltage transients. Semiconductors are relatively low voltage low power devices with very limited capacity to withstand high voltage. A direct hit by lightning on an antenna is not required, and even a close strike can cause sufficient voltage to be induced to cause semiconductor damage due to surges of DC voltage above the capacity of the semiconductor. Similarly, accidental contact of an antenna with a voltage source such as power lines or induced EMP voltage can cause severe voltage surges in a radio or TV system.

Ordinarily, the semiconductors experience only normal operating voltage levels, typically 6 to 12 volts, provided by a battery or power supply. A lightning strike close to a transmission or receiving antenna or other induced voltage may produce sufficient transient voltage surge to damage semiconductors in the system requiring the replacement of the damaged semiconductor causing severe financial loss and disruption of broadcasting capability. A direct hit on the antenna can be even more devastating, destroying the entire system and perhaps other facilities as well. Further, less severe induced voltages from wind, rain, snow, lightning that ordinarily produce noise or static in the system can be a significant problem for an RF frequency system even if not severe enough to cause semiconductor damage.

Lightning or surge protection devices heretofore known in the art have suffered various disadvantages. For example, early devices utilized a discharge unit comprising a small air gap or spark gap between closely placed conductors connected between the 15 signal conducting line and ground so that if there was a lightning strike, the air gap device arced over discharging the voltage surge to ground. Such devices are inherently inadequate because a relatively high voltage is required to ionize the air gap producing a firing lag time, often permitting greater voltage surges before firing than the semiconductors could withstand. Further, once the unit has fired, a plasma arc path is formed that tends to continue for a period of time after conclusion of the lightning strike resulting in a continued signal loss. Such air gap units can also withstand only a few lightning strikes before the conductors are damaged or oxidized such that their effectiveness is reduced requiring frequent replacement to maintain system safety.

With the development of the gas discharge tube, the air gap devices were eliminated and replaced with surge protection devices using gas discharge tubes that do not deteriorate from frequent use. Examples of such devices are illustrated in U.S. Pat. Nos. 4,554,608, 4,409,637, and 4,359,764 all by the same inventor, Block.

However, such gas tube discharge devices have also been found to be inadequate for a variety of reasons. First, if the breakdown voltage of the gas discharge tube is sufficiently low to assure that voltage surges will not damage semiconductors in the system, peak voltages in the transmitted radio frequency signal may be sufficient to trigger the discharge tube resulting in momentary interruption of signal. Further, since the breakdown voltage of the tube must be sufficiently above the signal voltage to prevent the aforesaid signal interruption problem, minor voltage transients such as storm or equipment induced DC static are transmitted or received and are not immediately eliminated because they are not of sufficient magnitude to trigger the gas tube. Such minor transients must be drained by the dielectric of the transmission line which can take a considerable length of time producing prolonged static and reception noise.

Various solid state devices have been used for lightning surge suppression such as varistors, e.g., U.S. Pat. No. 3,863,111—Martzloff, and avalanche type diodes, e.g., U.S. Pat. No. 3,777,219—Winters. However, such devices have not been satisfactory because such solid state devices have low power capacity making them susceptible to same voltage surge damage they are to eliminate, and they have inherent capacitance which tends to load an RF system reducing signal levels unless corrective measures are taken. Thus, such devices are typically used in conjunction with other higher power devices such as gas tubes and air gap units that will protect the solid state device against high power damage or in systems where the expected power level is limited to a level below the rated capacity of the device.

The present invention eliminates the above deficiencies in the prior art Transients as low as 0.01 volts DC that would produce static or noise in prior systems, are effectively eliminated, but the device is not susceptible to damage from repeated lightning strikes. Further, since the invention uses an inductive coil and does not rely on solid state devices, it can safely dissipate very high induced power levels.

BRIEF SUMMARY OF THE INVENTION

A device for electromagnetic static and voltage suppression of transmitted radio frequency signals in accordance with the present invention comprises a first and second electrical connector having first conductors for conducting the radio frequency signal from an antenna to receiver or from a transmitter to antenna and secondary conductors electrically connected to ground. A capacitor means is connected between the primary conductors of the first and second connectors. The capacitor means blocks DC current while allowing conduction of the RF signals An inductor means is connected between the antenna side of the capacitor means and ground. The value of the inductor means is sufficient to block conduction of the radio frequency signals but it allows DC and low frequency transients to be conducted to ground. A gas discharge means is also connected in parallel with the inductor means between the antenna side of the capacitor means and ground. The gas discharge means will conduct DC current to ground only after a predetermined voltage caused by back emf from the inductor means is exceeded. A resistor means is connected from the other side of the capacitor means to ground to discharge any voltage developed on the capacitor due to capacitance storage.

The first and second connectors are mounted to a grounded shielded housing so that the secondary conductors are electrically connected to the housing and the primary conductors are electrically isolated from the housing. The first and second connectors are adapted to be connected to a shielded radio frequency transmission cable having a central conductor and a grounded coaxial shield around the central conductor so that the primary conductors are connected to the central conductor of the cable and the secondary conductors are connected to the coaxial shield.

It is a principle object of the present invention to provide a device for electromagnetic static and voltage suppression that instantly conducts DC transient voltage surges to ground without the need for a voltage buildup to exceed the firing voltage of a discharge tube.

It is yet another object of the present invention to provide a device for electromagnetic static and voltage suppression that is not susceptible to damage due to repeated operations.

It is yet another object of the present invention to provide a device for electromagnetic static and voltage suppression that neutralizes all transients from all sources including wind, rain, snow, lightening, EMP induction and direct voltage impact.

These and other objects, advantages and features shall hereinafter appear in the preferred embodiment described below.

DETAILED DESCRIPTION OF THE PREFERRED EMBODIMENT

Figure 1:
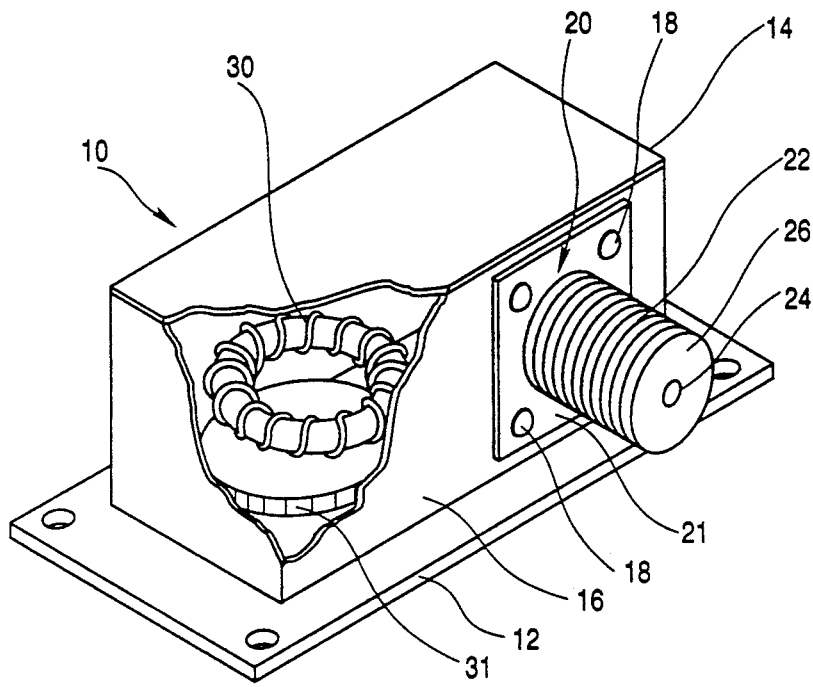
FIG. 1 is a front perspective partially fragmentary view of a preferred embodiment of the present invention.

With reference to FIG. 1, device 10 for electromagnetic static and voltage suppression comprises a rectangular base 12 upon which is mounted a hollow rectangular housing 14. Base 12 and housing 14 are made of any suitable metal that will conduct electrical current. Mounted to one side wall 16 of housing 14 by bolts 18 is a standard female shielded coaxial cable connector 20. Connector 20 has a rectangular base 21 and a threaded circular exterior portion 22 extending from the base 21 adapted to engage the mating threads of a standard male cable connector. A secondary conductor is formed through exterior portion 22, base 21, housing 14 and base 12 to ground. A female primary conductor receptacle 24 is positioned in the end of connector 20 and isolated from the threaded circular exterior portion 22 by 15 annular insulation 26 that electrically isolates receptacle 24 from exterior portion 22 and base 21. Primary conductor receptacle 24 extends into the interior of housing 14 so that electrical components can be connected thereto, and is adapted externally to receive a male terminal from a mating cable connector.

On the opposite side of device 10, a second female shielded coaxial cable connector 40 (not shown in FIG. 1) of the same construction is mounted in the same way to the opposite wall. Base 21 is in electrical contact with housing 14 which in turn is in electrical contact with base 12 which is normally mounted to an electrically grounded structure. Housing 14 and base 12 act as a shielded housing for the components contained within.

The radio frequency transmission cable normally connected to connector 20 is standard coaxial shielded cable having a central primary conducting wire for RF signal and a coaxial ground shield positioned around the central conducting wire and insulated therefrom When connected to connector 20, the central primary conducting wire electrically connects with primary conducting receptacle 24 and the coaxial shield is electrically connected to the exterior portion 22 which forms the secondary conductor to ground.

The components of the system are mounted within housing 14. With reference to FIG. 1, portions of inductor coil 30 and capacitor 32 within housing 14 are shown. However, it should be recognized that FIG. 1 does not permit all of the components to be illustrated.

Figure 2:
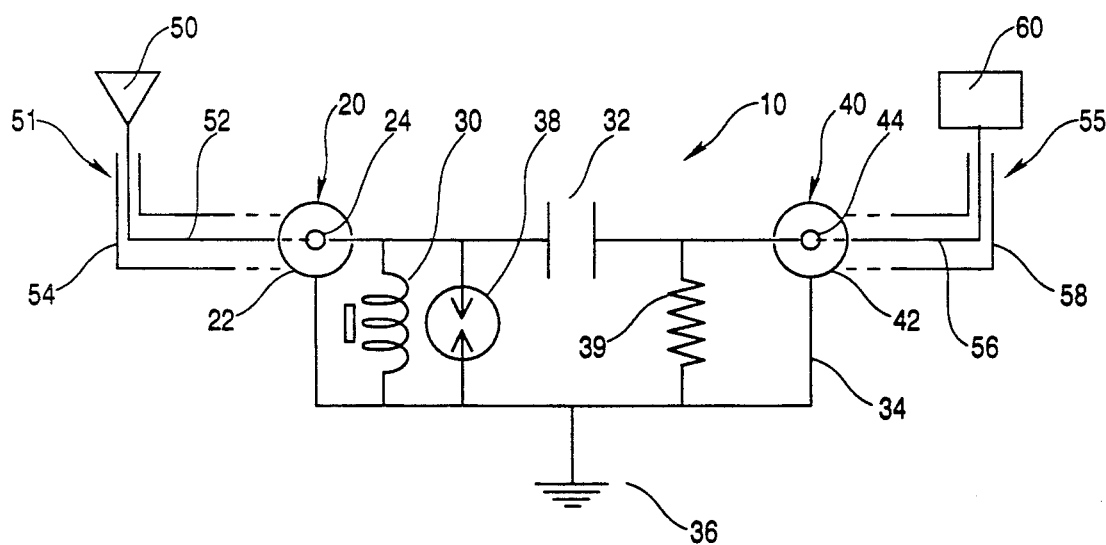
FIG. 2 is a circuit diagram of the circuitry of the preferred embodiment of the present invention.

With reference to FIG. 2, a circuit diagram of the preferred embodiment is illustrated. First connector 20, primary receptacle 24 and exterior secondary conducting portion 22 are graphically illustrated. Also shown is second connector 40 having a primary conductor receptacle 44 and secondary conducting portion 42. Shielded housing 14 is generally graphically depicted by line 34 which is shown electrically connected to a ground 36.

An antenna 50 is graphically illustrated being connected by a transmission cable 51 depicted by primary conductor 52 and coaxial shield 54 which is connected to first connector 20. Similarly, a transmitting cable 55 depicted by primary conductor 56 and coaxial shield 58 is illustrated connected to a device 60 which may be either an RF transmitter or receiver A capacitor 32 is shown connected between the primary conductor receptacles 24 and 44 of connectors 20 and 40. Capacitor 32 blocks conduction of DC current from primary conductor receptacles 24 and 44, however, capacitor 32 is of a value that permits conduction of any RF signal on primary conductor receptacle 24 to primary conductor receptacle 44 with substantially no signal loss. Capacitor 32 typically has a value of 0.02 MFD and a rating of 4 KV or higher. However, the value of capacitor 32 may be varied depending on the system parameters, but generally values may be adjusted between about 0.01 and 0.03 MFD.

Connected from the antenna side of capacitor 32 to shielded housing 34 is inductor coil 30. Coil 30 has a value of approximately 50 Micro-Henries and comprises approximately nine turns of number 12 teflon insulated, silver plated, stranded wire on a ¾ inch o.d. ferrite toroid. Usually about twelve inches of wire is required The value of coil 34 is selected so that RF signal conduction is essentially blocked so that there is substantially no signal loss. The value of coil 30 may be adjusted depending on the system parameters, but generally the values may vary between about 25 and 75 Micro-Henries A standard gas discharge unit 38 is also connected from the antenna of capacitor 32 to housing 34 in parallel with coil 30. Gas discharge unit is normally an open circuit but it has a break down or conducting voltage above which it commences conducting. Typically, gas discharge unit 38 is rated at 600 Volts DC or higher for commencing conduction, but the value can be varied depending on system parameters. The value must be above the peak of signal voltage but below the rated voltage of capacitor 32.

A resistor 39 is connected from the other side of capacitor 32 to housing 34. Resistor typically has a value of 150 K Ohms, but it may be varied depending on system parameters, and may be adjusted between approximately 100 K Ohms and 200 K Ohms.

Operation of device 10 may best be explained with reference to FIG. 2. Device 10 is positioned between an antenna 50 and either an RF transmitter or receiver 60. Normally, a coaxial shielded transmission cable 51 is connected from an antenna 50 to connector 20 and coaxial cable 55 is connected between the receiving or transmitting equipment 60 and connector 40. RF signal on the primary conductor 52 is transmitted unimpeded to conductor 56 since capacitor 32 has very low impedance to RF frequency signals. However, coil 30 has a very high impedance to RF frequency signal so that there is virtually no signal loss across coil 30. Similarly, resistor 39 is of a sufficiently high value that there is little signal loss across that resistor Gas discharge unit 38 acts as an open circuit at normal operating voltages so there is little signal loss across that unit except for insignificant loss due to inherent capacitance of the unit.

If a voltage surge is produced or induced on antenna 50 due to lightning strike or other causes, coil 30 acts as a dead short to ground for any DC voltage or any low frequency voltage transients. Thus, coil 30 is the primary discharge unit of the system which eliminates all DC and low frequency induced voltages. There is no delay or lag time that might, cause damage to the system since coil 30 conducts without delay of a voltage buildup. Further, since coil 30 acts as a dead short conducting all DC and low frequency transients to ground, there is no possibility of deterioration of the device regardless of how many times it experiences a voltage surge.

Gas discharge unit 38 acts as a secondary backup discharge unit in the case of extremely rapid voltage surges due to a direct lightning strike or other high voltage induced transient Ordinarily, the induced voltage surge is slow enough that the coil 30 acts as the principal active element to eliminate the surge. However, since coil 30 does have inductive reactance to rapidly increasing or decreasing transient currents, it is possible that a back EMF could develop across coil 30 upon the collapse of the magnetic field upon rapid cessation of current flow through coil 30 during operation depending on the wave form of the voltage surge. A relatively slow surge will not produce such a back emf but an extremely rapidly decaying surge could produce such a back emf across coil 30. The voltage spike produced by the collapsing magnetic field of coil 30 could be of sufficient magnitude to damage capacitor 32 unless a secondary gas discharge unit 38 is provided. This gas discharge unit normally does not fire if the transient surge from antenna 50 is small enough or slow enough not to produce a back emf from coil 40 of sufficient magnitude to exceed the break down voltage of the device. Generally, EMP and lightning surges occur in the range of 1/1000 of a second (equivalent to 1 Khz) or slower, in which case, the coil 30 is of such low impedance that it acts as a dead short to ground. However, if the voltage surge is rapid enough, it is possible that a back emf can develop across coil 30 above the rated voltage of gas discharge unit 38. When this occurs, unit 38 fires and conducts the surge directly to ground before capacitor 32 breaks down.

It should be recognized that discharge unit 38 is only a secondary backup device, and coil 30 serves as the primary discharge element of the system. If the voltage surge event were ever fast enough from beginning to end that it would approximate a frequency high enough that the impedance of coil 30 would restrict or prevent current flow, that event would also be too fast for the gas discharge unit 38 to operate. Such gas discharge units have an inherent operation lag time of about 2-5 nano-seconds. If the speed of the event exceeds this limit, the gas discharge unit cannot operate quickly enough to prevent damage Fortunately, induced voltage surge events are in a time duration range well below the frequency at which the impedance of coil 30 becomes a factor. Thus, coil 30 serves as the principal active discharge element and gas discharge unit 38 only serves in rare occasions where the current termination is abrupt enough to cause a significant back emf due to the collapsing magnetic field Since it is possible to store voltage on capacitor 32 as a result of an induced voltage differential across capacitor 32, resistor 39 is provided to discharge any such induced voltage to ground. Without resistor 39, the induced stored voltage would produce static and noise until dissipated by the dielectric of the cable.

The advantages of the present invention are apparent. The device neutralizes acquired static and voltage impulse transients which occur naturally and by man made methods from both induction coupling and direct impact. The device is RF passive but DC shorting and blocking all in the same unit. The device neutralizes all transients from all sources including wind, rain, snow, lightning, EMP induction, and direct voltage impact, e.g., accidental impact with power lines or other voltage sources. Voltages as low as 0.01 VDC are neutralized to ground potential immediately. This is achieve by using a low inductance coil to conduct immediately all low frequency and DC voltage to ground with a backup of a parallel gas discharge unit to discharge any back EMF that might be developed across the coil that might otherwise damage the device.

It should be understood that the present invention protects against voltage surges on the center conductor of a coaxial RF transmission cable. Because of the difference in size and resistance, the velocity factor, i.e. the speed at which current flows through a conductor, is different for the center conductor and the exterior shield conductor. Accordingly, the external shield conductor is more exposed to voltage surges and experiences surges more frequently, thereby protecting the center conductor. However, it is still possible for voltage surges to be induced on the center conductor with the aforesaid adverse results. The present invention provides an inexpensive, effective means of protecting the center conductor and eliminating surges induced thereon.

It should be recognized that various alteration, modifications and changes may be made to the above described preferred embodiment without departing from the spirit and scope of the invention as defined in the following claims.

I claim:

1. A device for electromagnetic static and voltage suppression of transmitted radio frequency signals comprising:
    a first electrical connector having a primary conductor for conducting the radio frequency signals and a secondary conductor connected to electrical ground;
    a second electrical connector having a primary conductor for conducting the radio frequency signals and a secondary conductor connected to electrical ground;

a capacitor means electrically connected between said primary conductors of said first and second electrical connectors, said capacitor means for blocking conduction of DC current and allowing conduction of the radio frequency signals between said first and second connectors;

an inductor means connected between said primary conductor of said first electrical connector and electrical ground, said inductor for blocking conduction of radio frequency signals but allowing conduction of DC current to electrical ground whereby DC voltage surges are immediately conducted to ground;

a discharge means connected between said primary conductor of said first electrical connector and ground, said discharge means for conducting direct current to ground when the DC voltage on said primary conductor exceeds a predetermined value substantially in excess of the maximum voltage of the radio frequency signal on said primary conductor, whereby DC voltage surges in excess of said predetermined value are conducted to electrical ground;

a resistor means connected between said primary conductor of said second electrical connector and electrical ground for discharging any DC voltage developed on said capacitor means without significantly diminishing the voltage of the radio frequency signal.

2. A device for electromagnetic static and voltage suppression of transmitted radio frequency signals as claimed in claim 1 wherein said first and second electrical connectors are mounted to an electrically grounded shielded housing so that said secondary conductor is electrically connected to said housing and said primary conductors are electrically isolated therefrom and the capacitor means, inductor means, discharge means, and resistor means are inside said shielded housing.

3. A device for electromagnetic static and voltage suppression of transmitted radio frequency signals as claimed in claim 1 wherein said first and second electrical connectors are adapted to be connected to a shielded radio frequency transmission cable having a central conductor for conducting radio frequency signals and coaxial shield around said central conductor so that the primary electrical conductors are electrically connected to said central conductor and the secondary conductors are connected to said coaxial shield.

4. A device for electromagnetic static and voltage suppression of transmitted radio frequency signals as claimed in claim 1 wherein said capacitor means is a capacitor with a value of between 0.01 to 0.03 MFD.

5. A device for electromagnetic static and voltage suppression of transmitted radio frequency signals as claimed in claim 1 wherein said inductor means is a coil with a value of between 25 and 75 Micro-Henries.

6. A device for electromagnetic static and voltage suppression of transmitted radio frequency signals as claimed in claim 1 wherein said discharge means is a gas discharge unit and said predetermined value is at least 600 volts DC.

7. A device for electromagnetic static and voltage suppression of transmitted radio frequency signals as claimed in claim 1 wherein said resistor means is a resistor with a value of between 100 and 200 Kilo Ohms.

8. A device for electromagnetic static and voltage suppression of transmitted radio frequency signals comprising:

a metallic shielded housing electrically connected to ground;

a first electrical connector having a primary conductor for conducting the radio frequency signals and a secondary conductor, said first electrical connector mounted to said housing so that said primary conductor is electrically isolated from said housing and said secondary conductor is electrically connected to said housing;

a second electrical connector having a primary conductor for conducting the radio frequency signals and a secondary conductor, said second electrical connector mounted to said housing so that said primary conductor is electrically isolated from said housing and said secondary conductor is electrically connected to said housing;

a capacitor means within said housing electrically connected between said primary conductors of said first and second electrical connectors, said capacitor means for blocking conduction of DC current and allowing conduction of the radio frequency signals between said first and second connectors;

an inductor means within said housing connected between said primary conductor of said first electrical connector and said housing, said inductor for blocking conduction of radio frequency signals but allowing conduction of DC current to said shielded housing whereby DC voltage surges are conducted to electrical ground;

a discharge means within said housing connected between said primary conductor of said first electrical connector and said housing, said discharge means for conducting direct current to said housing when the DC voltage on said primary conductor exceeds a predetermined value substantially in excess of the maximum voltage of the radio frequency signal on said primary conductor, whereby DC voltage surges in excess of said predetermined value are conducted to said shielded housing;

a resistor means within said housing connected between said primary conductor of said second electrical connector an said housing for discharging any DC voltage developed on said capacitor means without significantly diminishing the voltage of the radio frequency signal.

9. A device for electromagnetic static and voltage suppression of transmitted radio frequency signals as claimed in claim 1 wherein said first and second electrical connectors are adapted to be connected to a shielded radio frequency transmission cable having a central conductor and coaxial shield around said central conductor so that the primary electrical conductors are electrically connected to the central conductor and the secondary conductors are connected to said coaxial shield.

10. A device for electromagnetic static and voltage suppression of transmitted radio frequency signals as claimed in claim 1 wherein said capacitor means is a capacitor with a value of between 0.01 to 0.03 MFD.

11. A device for electromagnetic static and voltage suppression of transmitted radio frequency signals as claimed in claim 1 wherein said inductor means is a coil with a value of between 25 and 75 Micro-Henries.

12. A device for electromagnetic static and voltage suppression of transmitted radio frequency signals as claimed in claim 1 wherein said discharge means is a gas discharge unit and said predetermined value is at least 600 volts DC.

13. A device for electromagnetic static and voltage suppression of transmitted radio frequency signals as claimed in claim 1 wherein said resistor means is s resistor with a value of between 100 and 200 Kilo Ohms.

14. A device for suppression of DC transients and low level noise on a transmission line for radio frequency signals comprising:
- a first electrical connector for coupling to the transmission line having a primary conductor for conducting the radio frequency signals and a secondary conductor connected to electrical ground;
- a second electrical connector having a primary conductor for conducting the radio frequency signals and a secondary conductor connected to electrical ground;
- capacitor means electrically connected between said primary conductor of said first and second electrical connectors, said capacitor means for blocking conduction of DC current and allowing conduction of the radio frequency signals between said first and second connectors;
- inductor means connected between said primary conductor of said first electrical connector and electrical ground, said inductor means for blocking conduction of radio frequency signals but allowing conduction of DC transients and low level noise to electrical ground whereby DC voltage surges and low level noise are conducted to electric ground including discharge means connected between said primary conductor of said first electrical connector and electrical ground, said discharge means for conducting direct current to electrical ground when the DC voltage on said primary conductor of said first electrical connector exceeds a predetermined value substantially in excess of the maximum voltage of the radio frequency signal on said primary conductor, whereby DC voltage surges in excess of said predetermined value are conducted to electrical ground.

15. A device for suppression of DC transients and low level noise on a transmission line for radio frequency signals as claimed in claim 14, and further including resistor means connected between said primary conductor of said second electrical connector and electrical ground for discharging any DC voltage developed on said capacitor means without significantly diminishing the voltage of the radio frequency signal.

* * * * *

UNITED STATES PATENT AND TRADEMARK OFFICE
CERTIFICATE OF CORRECTION

PATENT NO. : 5,122,921

DATED : June 16, 1992

INVENTOR(S) : Michael R. Koss

It is certified that error appears in the above-identified patent and that said Letters Patent is hereby corrected as shown below:

```
Column 1    Line 47; delete "15".
Column 3    Line 14; delete "instantly".
Column 4    Line 5; add "." after "therefrom".
Column 5    Line 16, add "." after "resistor".
Column 5    Line 36; add "." after "transient".
Column 7    Line 12; delete "immediately".
Column 7    Line 13; insert "electrical" before "ground".
Column 8    Line 42; "an" should be "and".
```

Signed and Sealed this

Twenty-fourth Day of August, 1993

*Attest:*

BRUCE LEHMAN

*Attesting Officer*            *Commissioner of Patents and Trademarks*